(12) United States Patent
Choi et al.

(10) Patent No.: US 9,133,299 B2
(45) Date of Patent: Sep. 15, 2015

(54) POLY-URETHANE RESIN AND POLY-URETHANE ABSORBING PAD USING THE SAME

(75) Inventors: Sang-Soon Choi, Daejeon (KR); Young-Ji Tae, Gwacheon-si (KR); Dong-Mok Shin, Daejeon (KR); Keong-Yeon Yoon, Seoul (KR); Na-Ri Kim, Seoul (KR); Byeong-In Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 382 days.

(21) Appl. No.: 13/549,787

(22) Filed: Jul. 16, 2012

(65) Prior Publication Data

US 2013/0018118 A1    Jan. 17, 2013

(30) Foreign Application Priority Data

Jul. 15, 2011  (KR) .................. 10-2011-0070541
Jul. 13, 2012  (KR) .................. 10-2012-0076544

(51) Int. Cl.
*C08G 18/42* (2006.01)
*C08G 18/66* (2006.01)
*C08L 75/06* (2006.01)
*C08J 9/28* (2006.01)
*C08G 18/76* (2006.01)
*C08K 5/42* (2006.01)

(52) U.S. Cl.
CPC .......... *C08G 18/4238* (2013.01); *C08G 18/664* (2013.01); *C08G 18/7671* (2013.01); *C08L 75/06* (2013.01); *C08K 5/42* (2013.01); *C08L 2205/025* (2013.01)

(58) Field of Classification Search
None
See application file for complete search history.

(56) References Cited

U.S. PATENT DOCUMENTS

| 3,657,034 | A | * | 4/1972 | Fukushima et al. | ............ 156/77 |
| 4,510,186 | A | * | 4/1985 | Kuriyama et al. | ............ 427/381 |
| 4,746,684 | A | * | 5/1988 | Kuriyama et al. | ............ 521/137 |
| 4,945,016 | A | * | 7/1990 | Murachi | ............ 524/81 |

FOREIGN PATENT DOCUMENTS

| JP | 2004-297061 A | 10/2004 |
| JP | 2006-334745 A | 12/2006 |
| JP | 2010-017848 A | 1/2010 |
| KR | 10-2005-0018421 A | 2/2005 |
| KR | 10-2007-0010825 A | 1/2007 |
| KR | 10-0745050 B1 | 7/2007 |
| KR | 10-2012-0081955 A | 7/2012 |

* cited by examiner

*Primary Examiner* — Robert C Boyle
*Assistant Examiner* — Stephen Rieth
(74) *Attorney, Agent, or Firm* — Rothwell, Figg, Ernst & Manbeck, P.C.

(57) ABSTRACT

The present invention relates to a polyurethane resin composition including a first polyurethane resin and a second polyurethane resin that are different from each other in their compositions, an organic solvent, and a surfactant, and a polyurethane mounting pad manufactured from the resin composition.

15 Claims, 6 Drawing Sheets

POLY-URETHANE RESIN AND POLY-URETHANE ABSORBING PAD USING THE SAME

CROSS REFERENCE TO RELATED APPLICATION

The present application claims priority to and the benefit of Korean patent application Nos. 10-2011-0070541 and 10-2012-0076544 filed in the Korea Intellectual Property Office on Jul. 15, 2011 and Jul. 13, 2012, respectively, the entire content of which is incorporated hereinto by reference.

BACKGROUND OF THE INVENTION

Since a fine and precise surface is required for a substrate that is used for a semiconductor device or a display device requiring a high degree of integration, various planarization methods are applied. Particularly, due to the trend of high integration and high performance of the semiconductor device or display device, a polishing method of relatively moving a polishing pad and a subject to be polished, while supplying a slurry composition including polishing particles and various chemical ingredients between the polishing pad and the subject to be polished, is generally used. In this polishing method, for more precise polishing, the subject to be polished is fixed on a mounting pad so as to maintain a constant location and position during the polishing or processing process.

Meanwhile, Japanese Patent Publication No. 2006-334745 discloses a polyurethane foam prepared by reacting and curing polyols, polyisocyanates, a foaming agent, a catalyst, and a water repellent, and a polishing pad obtained using the same. However, since this polyurethane foam is obtained by using a foaming agent such as water, methylene chloride, or carbon dioxide gas, it has a relatively high hardness or it is difficult to form uniform distribution of long and large internal pores, and to obtain high compressibility and compression recovery rate in the range of low hardness.

The previously known mounting pad has internal pores of different sizes and the distribution of the pores is irregular, and thus the cushion property and adsorption to a subject to be polished are poor. Further, a subject to be polished cannot securely contact the mounting pad during a polishing process, and thus precise polishing may not be achieved. In addition, since the previous mounting pad exhibits non-uniform size and distribution of internal pores, the physical properties such as compressibility and compression recovery rate are poor and water repellency is not sufficient, and thus a subject to be polished does not have uniform contact during a polishing or processing process.

Accordingly, there is a need to develop a novel mounting pad for more precise and efficient polishing of the substrate that is used in a semiconductor device or a display device.

SUMMARY OF THE INVENTION

The present invention relates to a polyurethane resin composition and a polyurethane mounting pad, and more particularly, to a polyurethane resin composition capable of providing a mounting pad that has uniform distribution of long and large internal pores, shows high compressibility and compression recovery rate, and is used in the polishing process of a substrate or glass used in a semiconductor device or a display device so as to minimize surface defects, roughness, and waviness, and a polyurethane mounting pad obtained from the resin composition.

The present invention provides a polyurethane resin composition including: a first polyurethane resin that includes a soft segment containing a polyol residue containing 1,4-butanediol and ethylene glycol at a molar ratio of 8:2 to 2:8 and a polycarboxylic acid residue, and a hard segment containing a polyisocyanate compound residue and a chain extender residue; a second polyurethane resin that has a different composition from that of the first polyurethane resin, a soft segment containing a polyol residue containing 1,4-butanediol and ethylene glycol at a molar ratio of 8:2 to 2:8 and a polycarboxylic acid residue, and a hard segment containing a polyisocyanate compound residue and a chain extender residue; an organic solvent including one or more selected from the group consisting of dimethyl formamide (DMF) and methylethylketone (MEK); and a surfactant, in which the first polyurethane resin and the second polyurethane resin include 20 to 32% by weight of the polyisocyanate compound residue, respectively.

Further, the present invention provides a polyurethane mounting pad, including a wet coagulated material of the polyurethane resin composition.

DETAILED DESCRIPTION OF THE INVENTION

Figure 1:
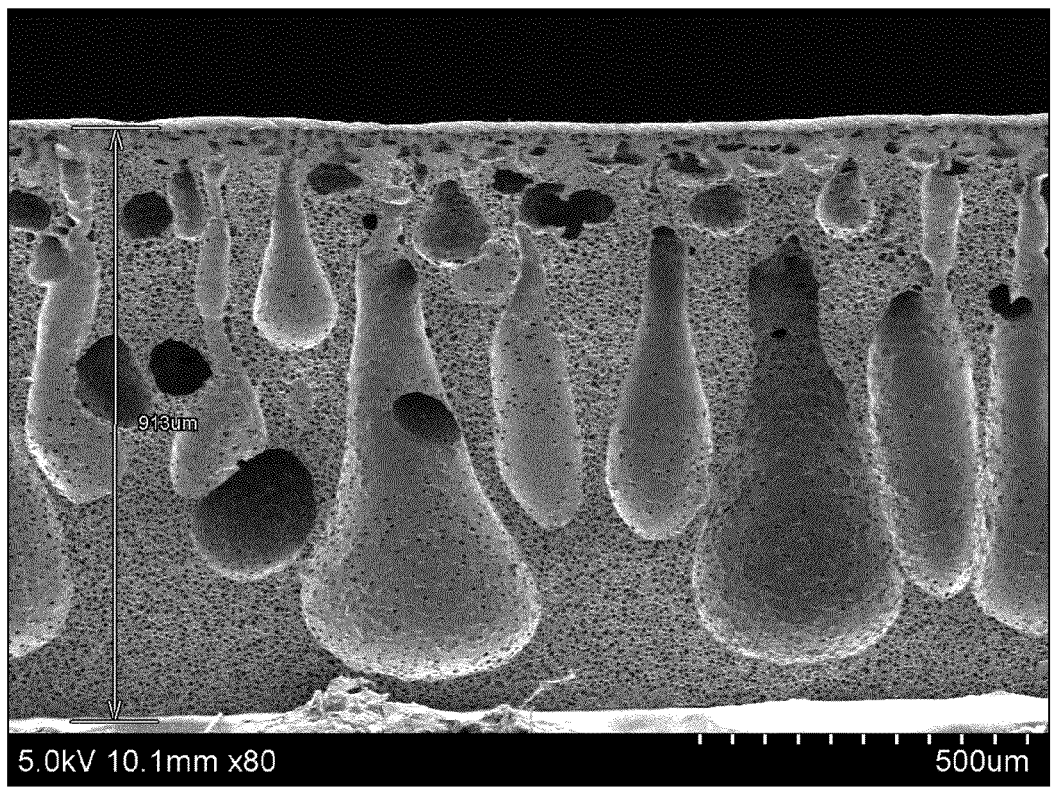
FIG. 1 is an optical microscopic image showing the cross-section of a mounting pad obtained from a polyurethane resin composition of Example 1.
Figure 2:
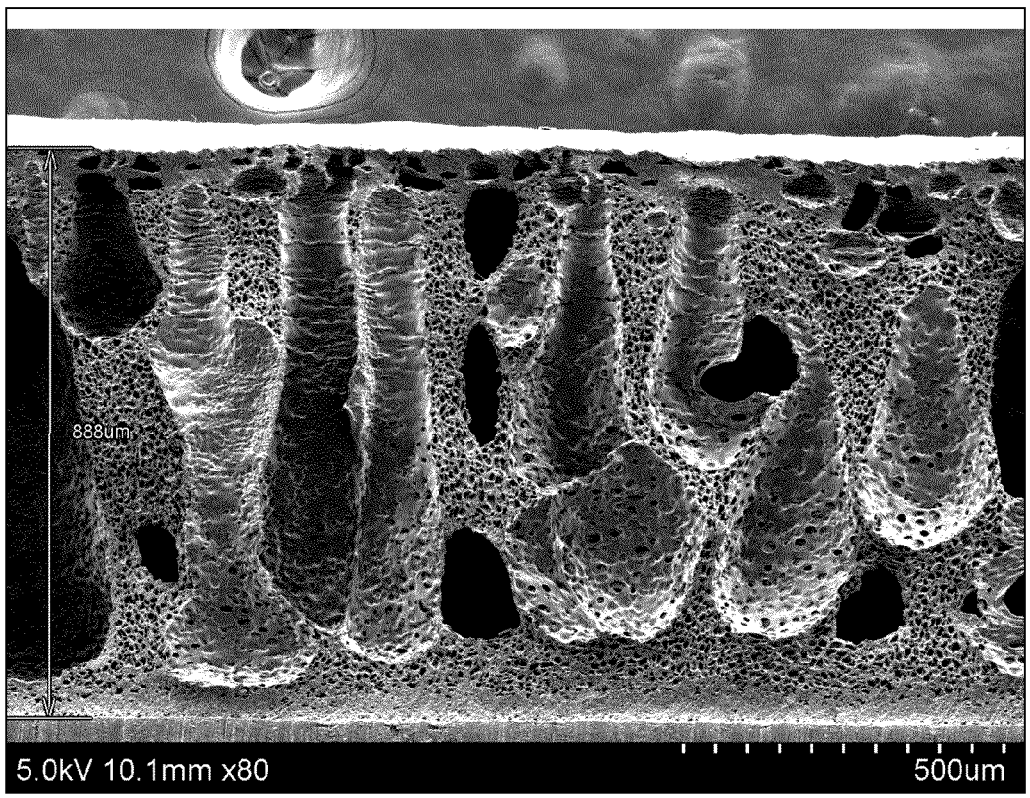
FIG. 2 is an optical microscopic image showing the cross-section of a mounting pad obtained from a polyurethane resin composition of Example 2.
Figure 3:
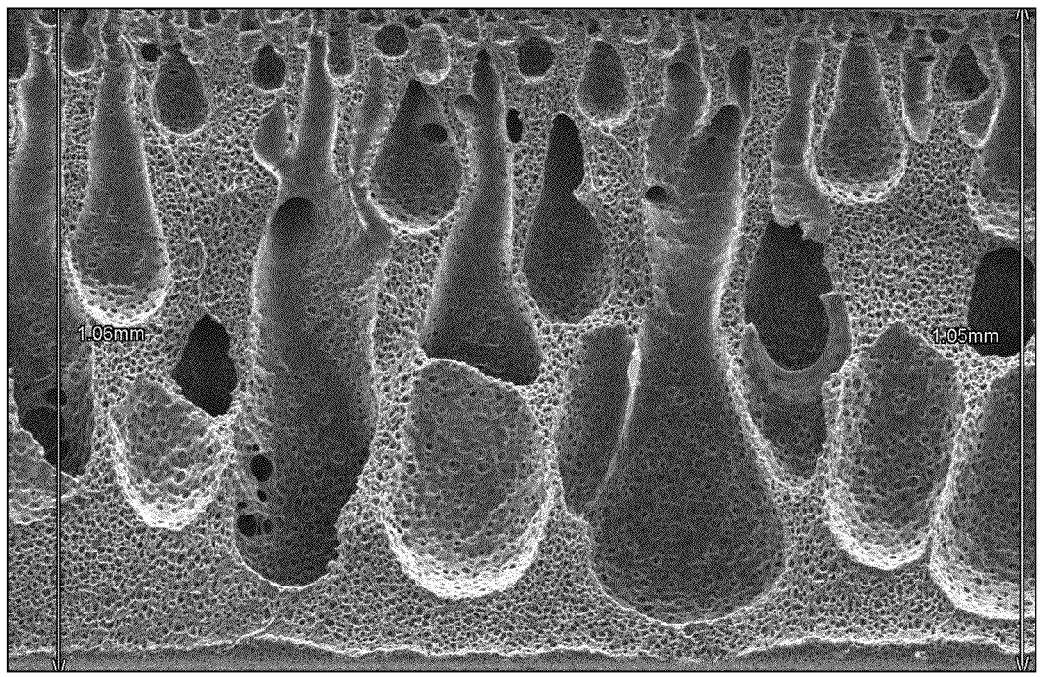
FIG. 3 is an optical microscopic image showing the cross-section of a mounting pad obtained from a polyurethane resin composition of Example 3.
Figure 4:
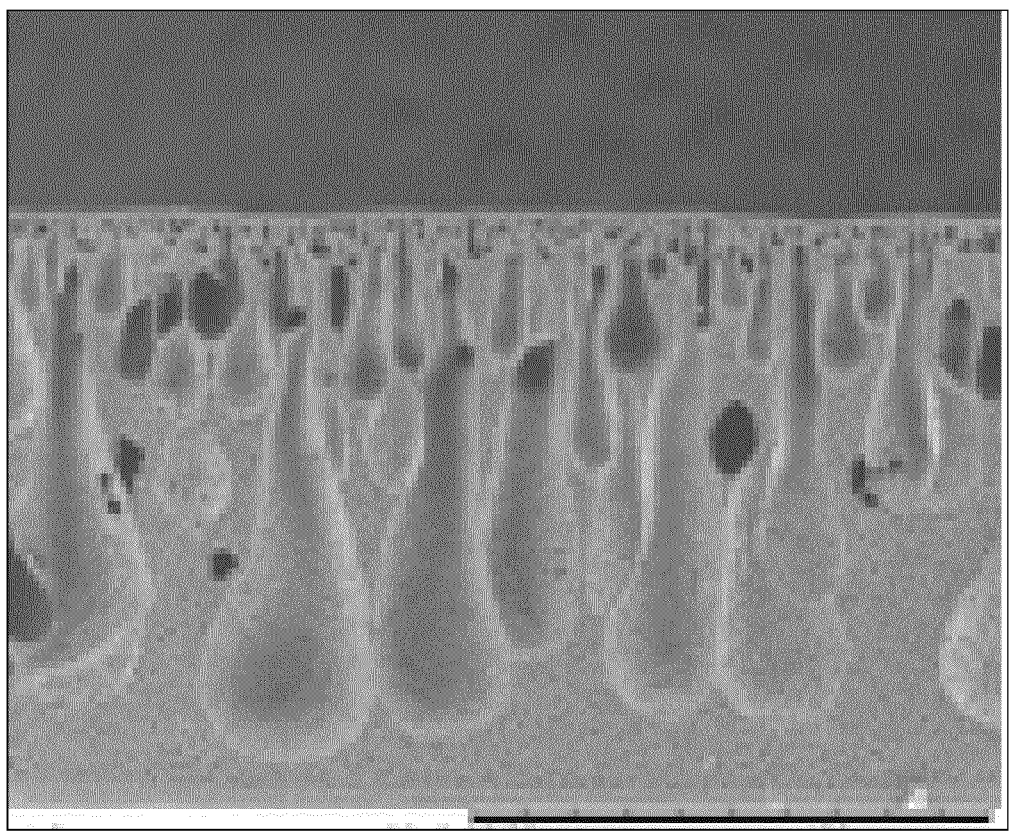
FIG. 4 is an optical microscopic image showing the cross-section of a mounting pad obtained from a polyurethane resin composition of Example 4.

Hereinafter, a polyurethane resin composition and a polyurethane mounting pad according to specific embodiments of the present invention will be described in more detail.

As used herein, the term "mounting pad" refers to a pad that functions to attach or fix a film to be polished to a carrier in a polishing process during a manufacturing process of a substrate used in a semiconductor or display device.

Further, as used herein, the term "residue" refers to a part or unit that is derived from a particular compound and is included in resulting compounds of a chemical reaction, when the particular compound participates in the chemical reaction. For example, the term "polyol residue" refers to a part derived from the polyol molecule among the reaction products.

According to one embodiment of the present invention, provided is a polyurethane resin composition, including: a first polyurethane resin that includes a soft segment containing a polyol residue containing 1,4-butanediol and ethylene glycol at a molar ratio of 8:2 to 2:8 and a polycarboxylic acid residue, and a hard segment containing a polyisocyanate compound residue and a chain extender residue; a second polyurethane resin that has a different composition from that of the first polyurethane resin, a soft segment containing a polyol residue containing 1,4-butanediol and ethylene glycol at a molar ratio of 8:2 to 2:8 and a polycarboxylic acid residue, and a hard segment containing a polyisocyanate compound residue and a chain extender residue; an organic solvent including one or more selected from the group consisting of dimethyl formamide (DMF) and methylethylketone (MEK); and a surfactant, in which the first polyurethane resin and the second polyurethane resin include 20 to 32% by weight of the polyisocyanate compound residue, respectively.

The results of the study conducted by the present inventors showed that when a resin composition obtained by mixing two or more polyurethane resins having different chemical structures is used, a polyurethane absorbing pad showing a much better effect than that prepared by using a single polyurethane resin, for example, having uniform distribution of long and large internal pores and high compressibility and compression recovery rate, can be provided.

Further, each of the different polyurethane resins may be a resin in which the specific components constituting the soft and hard segments of the polyurethane resin and the composition ratio thereof are adjusted within a particular range, and therefore, the polyurethane resins can have different chemical structures from each other.

In particular, each of the first polyurethane resin and the second polyurethane resin included in the polyurethane resin composition may include the soft segment containing a polyol residue containing 1,4-butanediol and ethylene glycol at a molar ratio of 8:2 to 2:8 and a polycarboxylic acid residue, and the hard segment containing a polyisocyanate compound residue and a chain extender residue.

The first polyurethane resin and the second polyurethane resin may have different compositions. That is, particular compound-derived residues included in the resins or contents thereof may be different from each other.

In particular, the contents of the polyisocyanate compound residues included in the first polyurethane resin and the second polyurethane resin may be different from each other. In addition, the molar ratios of 1,4-butanediol and ethylene glycol contained in the polyol residues of the first polyurethane resin and the second polyurethane resin may be different from each other. If the residues of the compounds constituting each soft segment of the first polyurethane resin and the second polyurethane resin, for example the soft segments, are derived from the polyester polyol, the weight-average molecular weights of the polyester polyols included in the first polyurethane resin and the second polyurethane resin may be different from each other.

As shown in the following examples, the present inventors demonstrated that a mounting pad having excellent physical properties and quality can be manufactured by using the first polyurethane resin and the second polyurethane resin having different compositions or contents of the particular components within the above-described range.

That is, the present inventors manufactured a mounting pad which has uniform distribution of long and large internal pores, shows high compressibility and compression recovery rate, and is used in the polishing process of a substrate or glass used in a semiconductor device or a display device so as to minimize surface defects, roughness, and waviness, by using the mixture of the first polyurethane resin and the second polyurethane resin having different compositions or constitutions.

Meanwhile, each of the first polyurethane resin and the second polyurethane resin may include the soft segment and the hard segment, and the soft segment may contain the polyol residue containing 1,4-butanediol and ethylene glycol at a molar ratio of 8:2 to 2:8 or 6:4 to 4:6 and the polycarboxylic acid residue, and the hard segment may contain the polyisocyanate compound residue and the chain extender residue. As the polyurethane resin may include the soft segment and the hard segment, it may have predetermined elasticity.

The soft segment may include a reactant between polyol containing 1,4-butanediol and ethylene glycol at a molar ratio of 8:2 to 2:8, preferably 6:4 to 4:6, and polycarboxylic acid, and the reactant may be polyester polyol. Therefore, the soft segment may include the particular polyester polyol residue. The molar ratio of 1,4-butanediol and ethylene glycol may range from 8:2 to 2:8, and for example, the ratio may be 8:2, 7:3, 6:4, 5:5, 4:6, 3:7, 2:8, or a range therebetween.

The average value of the molar ratio of 1,4-butanediol: ethylene glycol in the first polyurethane resin and the molar ratio of 1,4-butanediol:ethylene glycol in the second polyurethane resin may be 7:3 to 3:7, or 6:4 to 4:6. That is, each soft segment in the first and second polyurethane resins may contain 1,4-butanediol and ethylene glycol at a molar ratio of 8:2 to 2:8. If an arithmetic average of the molar ratios is 7:3 to 3:7 or 6:4 to 4:6, a mounting pad having more preferred physical properties and quality can be provided from the polyurethane resin composition.

The polyester polyol may have a weight-average molecular weight of 1000 to 4000. The molecular weight of polyester polyol may affect the ratio of the soft segment within the polyurethane resin, and affect the compressibility, the compression recovery rate, or the shape and size of the pores of the mounting pad.

As described above, the weight-average molecular weights of the polyester polyols included in the first polyurethane resin and the second polyurethane resin may be the same as or different from each other. For example, when the first polyurethane resin and the second polyurethane resin are mixed with each other, the polyester polyols included in the soft segment of the first polyurethane resin and in the soft segment of the second polyurethane resin may have a weight-average molecular weight of 1000 to 4000. Preferably, an average value of the weight-average molecular weights (an average of each weight-average molecular weight) of the polyester polyols included in the soft segment of the first polyurethane resin and in the soft segment of the second polyurethane resin may be 1200 to 2400.

Meanwhile, the polycarboxylic acid may contain dicarboxylic acid having 4 to 8 carbon atoms, and preferably adipic acid.

The hard segment of the first polyurethane resin and the second polyurethane resin may include the polyisocyanate compound residue and the chain extender residue. The polyurethane resin may include 20 to 32% by weight, and preferably 21 to 30% by weight, of polyisocyanate compound residue.

As described above, the contents of the polyisocyanate compound residue included in the hard segments of the first polyurethane resin and the second polyurethane resin may be different from each other. For example, when the first polyurethane resin and the second polyurethane resin are mixed with each other, the content of the polyisocyanate compound residue included in the hard segment of the first polyurethane resin may be 20 to 25% by weight, and the content of the polyisocyanate compound residue included in the hard segment of the second polyurethane resin may be 25 to 32% by weight. Preferably, an average value of the contents (an average of each content) of the polyisocyanate compound residues included in the hard segments of the first polyurethane resin and the second polyurethane resin may be 23 to 30% by weight.

The polyisocyanate compound residue is a residue that affects the modulus properties of the mounting pad to be manufactured. If the content of the polyisocyanate compound-derived residue in the polyurethane resin is too low, the content of the hard segment in the polyurethane mounting pad becomes too low or it is difficult to manufacture the pad having a sufficient hardness or thickness, and the internal pores of the pad may not be sufficiently formed or the formed pores may not have the suitable shape or size. In addition, if the content of the polyisocyanate compound-derived residue in the polyurethane resin is too high, the hardness of the manufactured mounting pad may become excessively high, or the compressibility or compression recovery rate thereof may be greatly reduced.

The polyisocyanate-based compound means a compound having a plurality of isocyanate groups. The polyisocyanate-based compound may be polyisocyanate containing an aliphatic, cycloaliphatic, araliphatic, aromatic, or heterocyclic functional group, and it may be represented by chemical formula Q(NCO)n, wherein n is an integer of 2 to 4, and Q is an aliphatic, cycloaliphatic, aromatic, or araliphatic hydrocarbon functional group having 2 to 18 carbon atoms, and preferably 6 to 10 carbon atoms. Specific examples of the polyisocyanate-based compound include ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, dimeryl diisocyanate (DDI), 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate(MDI), naphthylene-1,5-isocyanate (NDI), and mixtures of two or more thereof.

The chain extender may include ethylene glycol and 1,4-butanediol. Preferably, it may include ethylene glycol and 1,4-butanediol at a molar ratio of 1:9 to 9:1, and more preferably 5:5 to 9:1. As ethylene glycol and 1,4-butanediol are used as the chain extender, in particular, they are used in the above molar ratio, the polyurethane resin and the mounting pad manufactured using the same may have proper density or hardness, and they may be manufactured to have a predetermined thickness or larger, and to obtain the compressibility, elastic modulus, density, and hardness that are required in the final product.

The first polyurethane resin and the second polyurethane resin may have a weight-average molecular weight of 100,000 to 900,000, and preferably 200,000 to 600,000, respectively. The weight-average molecular weight of the polyurethane resin may be based on 30% solid content. When the polyurethane resin having a molecular weight within the above range is used, a plurality of pores may be formed to show uniform size and distribution.

Meanwhile, it is preferable that a solvent having a high boiling point is used during the process of manufacturing the mounting pad using the resin composition. Specifically, the polyurethane resin composition may include an organic solvent containing dimethyl formamide (DMF), methylethylketone (MEK), or a mixture thereof, and preferably dimethyl formamide. As such, the organic solvent containing dimethyl formamide (DMF), methylethylketone (MEK), or a mixture thereof has a relatively high boiling point, and thus the physical properties of the solid of the polyurethane resin can be maintained as is. In addition, the organic solvent is highly hydrophilic, and is thus easily replaced with an aqueous solution during the coagulation of the pad manufacturing process, leading to uniform formation of long and large internal pores in the mounting pad.

The organic solvent may be included in an amount of 100 to 600 parts by weight, based on 100 parts by weight of the first polyurethane resin and the second polyurethane resin.

The polyurethane resin composition may form the polyurethane mounting pad having internal pores via coagulation, and the pore formation is attributed to phase separation of the polyurethane resin, water, and the organic solvent. Specifically, when the polyurethane resin dissolved in the organic solvent containing dimethyl formamide (DMF), methylethylketone (MEK), or a mixture thereof is immersed in a coagulation bath filled with a predetermined aqueous solution, phase separation of the polyurethane resin and the organic solvent occurs, and the organic solvent after the phase separation is replaced with the aqueous solution or water, leading to formation of pores. After the formation of pores, the residual organic solvent is removed via a washing and drying process so as to prepare the polyurethane resin pad that can be used in the mounting pad of a polishing apparatus.

Meanwhile, the polyurethane resin composition may include a surfactant, and the surfactant includes a nonionic surfactant, an anionic surfactant, or a mixture thereof that is known to be used in the polyurethane resin.

The anionic surfactant may increase penetration of water throughout the composition and prevent non-uniform phase separation of the polyurethane resin, water, and the organic solvent to allow uniform formation of internal pores in the mounting pad. The anionic surfactant may be included in an amount of 0.1 to 10 parts by weight, and preferably 0.5 to 5 parts by weight, based on 100 parts by weight of the first polyurethane resin and the second polyurethane resin. If the content of the anionic surfactant is too low, the size of the pores may be too small or the shape of the pores may not be long, and if the content is too high, the size of the pores may be too large, or distribution of the pores may not be uniform. Examples of the anionic surfactant include succinic acid, alkyl benzene sulfonic acid having 9 to 15 carbon atoms, or salts thereof.

Further, the nonionic surfactant may increase coagulation speed of the polyurethane resin composition or make the shape of the pores uniform. The nonionic surfactant may be included in an amount of 0.1 to 10 parts by weight, and preferably 0.5 to 5 parts by weight, based on 100 parts by weight of the first polyurethane resin and the second polyurethane resin. If the content of the nonionic surfactant is too high, the shape of the pores may not be uniform, and if the content is too low, the coagulation speed may become too low. Examples of the nonionic surfactant may include silicon polymers, silicon oil, glycerol-based polymers, and hydrocarbon-based polymers.

The polyurethane resin composition may further include a silicon-based polymer in order to increase adsorption of the mounting pad or planarize the surface of the pad. The polyurethane resin composition may further include one or more additives selected from the group consisting of a water repellent, a filler, a pore size controller, and a pigment.

Meanwhile, for the synthesis of the polyurethane resin, a predetermined catalyst may be optionally used in the reaction between the above-described polyester polyol, chain extender, and polyisocyanate-based compound, and examples thereof may include amine-based catalysts, organic titan compounds, organic tin compounds, and mixtures thereof. The catalyst may be used in an amount of 0.01 wt % to 5 wt %, based on the total weight of the polyurethane resin. Preferred examples of the catalyst may include organic tin compounds, and specifically, tin (II) salts of carboxylic acids such as tin (II) acetate, tin (II) octoate, tin (II) ethyl hexoate, and tin (II) laurate, and the tin (IV) compounds such as dibutyl tin oxide, dibutyl tin dichloride, dibutyl tin diacetate, dibutyl tin dilaurate, dibutyl tin maleate, and dioctyl tin diacetate.

Meanwhile, according to another embodiment of the present invention, a polyurethane mounting pad including a wet coagulated material of the polyurethane resin composition is provided.

As described above, the polyurethane absorbing pad may include two or more polyurethane resins having different structures, for example, the above-described first polyurethane resin and second polyurethane resin, and therefore it exhibits better effects than the absorbing pad including a single polyurethane resin.

The polyurethane absorbing pad includes two or more polyurethane resins having different structures, in which the specific components of the hard and soft segments of each polyurethane resin and the ratio thereof are adjusted within the particular range, thereby providing the absorbing pad with better effects than the known absorbing pad. Specifically, the polyurethane absorbing pad has uniform distribution of long and large internal pores, shows excellent compressibility and high compression recovery rate, and is used in the polishing process of a substrate or glass used in a semiconductor device or a display device so as to minimize surface defect, roughness, and waviness.

In the polyurethane mounting pad manufactured from the polyurethane resin composition, long and large pores are uniformly formed, and thus low hardness, excellent compressibility, and high compression recovery rate may be exhibited. Further, since long and large pores are uniformly formed in the polyurethane mounting pad, air generated between the polyurethane mounting pad and a film to be polished may be easily delivered inside and uniformly dispersed over the whole area, and thus defects generated during polishing may be minimized.

The polyurethane mounting pad may be formed by coagulation of the polyurethane resin composition. Specifically, the polyurethane mounting pad may be manufactured by forming the polyurethane resin composition; applying or introducing the polyurethane resin composition on a predetermined substrate or mold to form a coating layer; coagulating the coating layer; and washing, dehydrating, and drying the coagulated material of the composition.

The coagulating process of the coating layer may be conducted by introducing a substrate or mold on which the coating layer is formed, into a coagulation bath filled with a dimethyl formamide (DMF) aqueous solution, a methylethylketone (MEK) aqueous solution, or a mixture thereof, for example, a coagulation bath filled with 1 to 20% DMF aqueous solution. In the coagulation process, the organic solvent (e.g., dimethyl formamide or methylethylketone) in the polyurethane resin is replaced with water and the polyurethane resin is slowly coagulated, and therefore a plurality of pores may be formed. The coagulation time or the size of pores in the manufactured mounting pad can be controlled by adjusting the concentration of the organic solvent in the coagulation bath.

The polyurethane mounting pad may have a thickness of 0.5 to 3 mm, and preferably 1 to 2.5 mm, and a density of 0.10 to 0.50 g/cm$^3$, and preferably 0.15 to 0.30 g/cm$^3$.

Further, as the polyurethane mounting pad is manufactured by using the above-described polyurethane resin composition, it may have an Asker C hardness of 20 to 25, and preferably 21 to 23.

The polyurethane mounting pad may have the compressibility of 35% or higher and the compression recovery rate of 92% or higher.

The polyurethane mounting pad may have pores having a maximum diameter of 100 μm to 500 μm. The outermost distance of the neighboring pores among the pores may be 10 μm to 50 μm. Long oval-shaped pores can be uniformly distributed in the polyurethane resin including the coagulated material of the polyurethane resin composition.

According to the present invention, a mounting pad that has uniform distribution of long and large internal pores, shows high compressibility and compression recovery rate, and is used in the polishing process of a substrate or glass used in a semiconductor device or a display device so as to minimize surface defect, roughness, and waviness is provided.

Hereinafter, the actions and the effects of the present invention will be explained in more detail via specific examples of the present invention. However, these examples are merely illustrative of the present invention, and the scope of the invention should not be construed to be defined thereby.

EXAMPLE AND COMPARATIVE EXAMPLE

Preparation of Polyurethane Resin and Mounting Pad for Glass Polishing of Display Device Example 1. Preparation of Polyurethane Resin Adipic acid, ethylene glycol, and 1,4-butanediol were reacted at a temperature of 200° C. and under reduced pressure of 500 to 760 mmHg and vacuum conditions to synthesize polyester polyol. In this regard, a molar ratio of ethylene glycol:1,4-butanediol and a weight-average molecular weight of the synthesized polyester polyol are shown in the following Table 2.

The synthesized polyester polyol, a chain extender (ethylene glycol), and DMF were put in a reactor at atmospheric pressure (1 atm) and room temperature (RT) in the presence of dibutyl tin dilaurate, and the temperature was raised to 80° C. At the point of raising the reaction temperature to 80° C., diphenylmethane diisocyanate (MDI) was injected, and the viscosity of the reaction solution was adjusted under stirring for 2 hours to prepare a polyurethane resin.

2. Preparation of Polyurethane Resin Composition and Mounting Pad

Two types of the prepared polyurethane resins, DMF solution, and additives were mixed in the amounts described in the following Table 1, and stirred at high speed for 10 minutes with a paint shaker, and then centrifuged at 3000 rpm for 10 minutes to obtain a polyurethane resin composition of a slurry phase.

The obtained polyurethane resin composition was coated on a PET film to a thickness of 2.00 mm, and then coagulated in a coagulation bath of a 4 Brix % concentration. Then, the obtained coagulated material was washed, dehydrated, and dried to manufacture a polyurethane mounting pad.

The specific conditions of the coagulation, washing, and dehydration are as follows.

Coating process set
Coagulation time (min)/temp. (° C.): 30~35/35~37
Washing time (times)/temp. (° C.): 12/65
Coating dam thickness: 2 mm

Comparative Example

1. Preparation of Polyurethane Resin

Adipic acid, ethylene glycol, and 1,4-butanediol were reacted at a temperature of 200° C. and under reduced pressure of 500 to 760 mmHg and vacuum conditions to synthesize polyester polyol. In this regard, a molar ratio of ethylene glycol:1,4-butanediol and a weight-average molecular weight of the synthesized polyester polyol are the same as PU2 resin of Example 3 (Comparative Example 1) and PU2 resin of Example 4 (Comparative Example 2) of the following Table 2.

The synthesized polyester polyol, a chain extender (ethylene glycol), and DMF were put in a reactor at atmospheric pressure (1 atm) and room temperature (RT) in the presence of dibutyl tin dilaurate, and the temperature was raised to 80° C. At the point of raising the reaction temperature to 80° C., diphenylmethane diisocyanate (MDI) was injected, and the viscosity of the reaction solution was adjusted under stirring for 2 hours to prepare a polyurethane resin.

2. Preparation of Polyurethane Resin Composition and Mounting Pad

A polyurethane mounting pad was manufactured in the same manner as in the example, except that the prepared polyurethane resin was used alone.

TABLE 1

Injection Amount of Additive

| | PU resin | SD-7 | SD-11 | 8I | 607 | CB | DMF | Water repellent PS | FAT-7 | DBSA | PEG200 |
|---|---|---|---|---|---|---|---|---|---|---|---|
| Weight (g) | 50 | 0.75 | 2 | 0.25 | 0.15 | 3.5 | 30 | 1 | 0.75 | 0.25 | 1 |

1) SD-7, SD-11: nonionic surfactant (Pentachem)
2) 8I, 607, CB: additive
3) FAT-7: filler (Pentachem)
4) DBSA: para-dodecyl benzene sulfonic acid
5) PEG200: polyethylene glycol having weight-average molecular weight of 200

TABLE 2

Composition of Polyurethane Resin of the Example and Compressibility and Compression Recovery Rate of Mounting Pad

| | | Polyol | | MDI | | | Compression |
|---|---|---|---|---|---|---|---|
| Example | Section | BD:EG | Molecular weight | content (%) | Mixing ratio | Compressibility (%) | recovery rate (%) |
| 1 | PU resin 1 | 5:5 | 2000 | 21 | 0.5 | 40 | 92 |
|   | PU resin 2 | 5:5 | 2000 | 30 | 0.5 |    |    |
| 2 | PU resin 1 | 8:2 | 2000 | 30 | 0.5 | 40 | 92 |
|   | PU resin 2 | 5:5 | 2000 | 30 | 0.5 |    |    |
| 3 | PU resin 1 | 5:5 | 1000 | 21 | 0.5 | 40 | 92 |
|   | PU resin 2 | 5:5 | 2000 | 30 | 0.5 |    |    |
| 4 | PU resin 1 | 5:5 | 2000 | 21 | 0.5 | 40 | 92 |
|   | PU resin 2 | 5:5 | 2000 | 25 | 0.5 |    |    |

As shown in Table 2, when two types of the polyurethane resins prepared by using the polyol containing 1,4-butanediol and ethylene glycol at a particular ratio and a particular content of the polyisocyanate compound are used, a mounting pad having high compressibility and compression recovery rate, for example, compressibility of 35% or higher and compression recovery rate of 9 2% or higher, can be manufactured.

As shown in the following FIGS. 1 to 4, pores having a maximum diameter of 100 μm to 500 μm were found to be uniformly distributed in the polyurethane mounting pad of Example.

Figure 5:
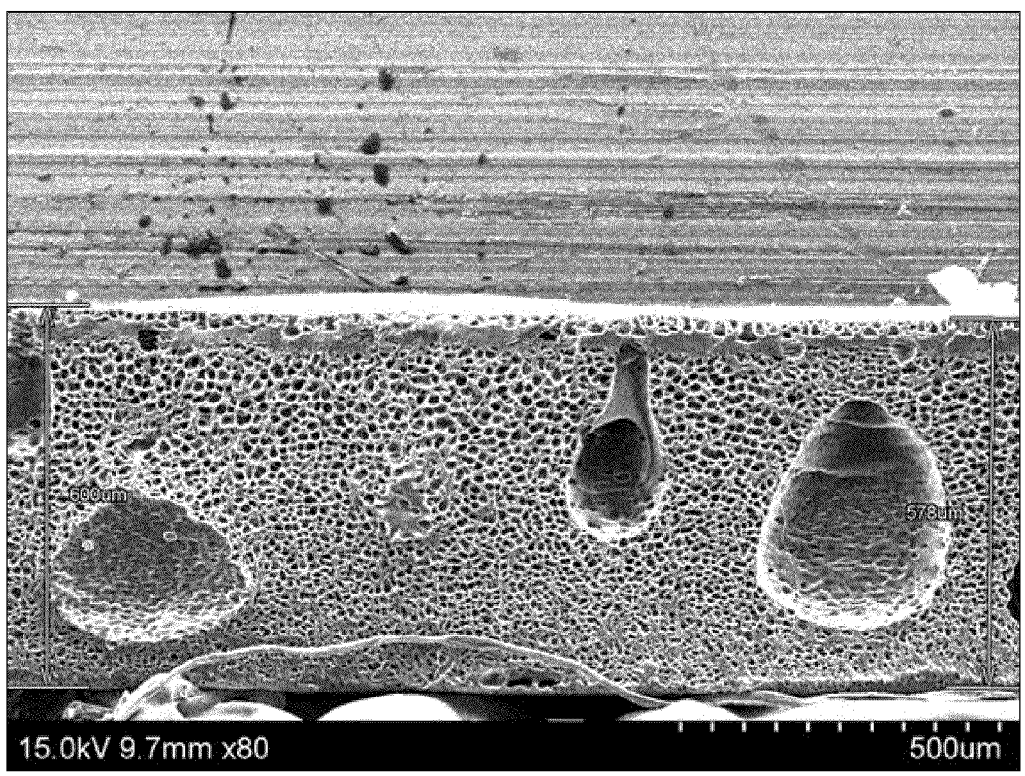
FIG. 5 is an optical microscopic image showing the cross-section of a mounting pad obtained from a polyurethane resin composition of Comparative Example 1.
Figure 6:
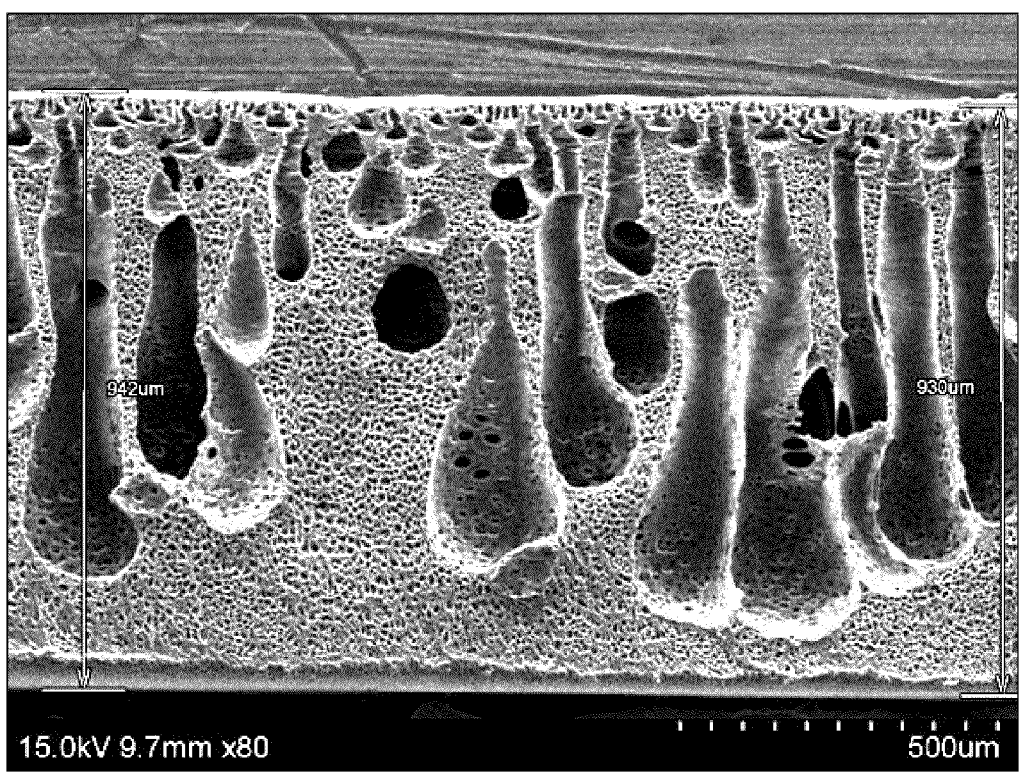
FIG. 6 is an optical microscopic image showing the cross-section of a mounting pad obtained from a polyurethane resin composition of Comparative Example 2.

In contrast, as shown in the following FIGS. 5 and 6, pores formed in the polyurethane mounting pad of the comparative example were found to be shorter or fewer and less uniform than those in the example. That is, it was found that quality of the polyurethane resin of comparative example was too poor to be applied for the practical polishing process.

What is claimed is:

1. A polyurethane resin composition comprising:

a first polyurethane resin that includes a soft segment containing a polyol residue containing 1,4-butanediol and ethylene glycol at a molar ratio of 8:2 to 2:8 and a polycarboxylic acid residue, and a hard segment containing a polyisocyanate compound residue and a chain extender residue;

a second polyurethane resin that has a different composition from that of the first polyurethane resin, and that includes a soft segment containing a polyol residue containing 1,4-butanediol and ethylene glycol at a molar ratio of 8:2 to 2:8 and a polycarboxylic acid residue, and a hard segment containing a polyisocyanate compound residue and a chain extender residue;

an organic solvent including one or more selected from the group consisting of dimethyl formamide (DMF) and methylethylketone (MEK); and a surfactant, wherein the first polyurethane resin and the second polyurethane resin include 20 to 32% by weight of the polyisocyanate compound residue, respectively, and wherein a) the average amount of the polyisocyanate compound residue included in the first polyurethane resin and the second polyurethane resin are different from each other or
b) the polyol residue of the first polyurethane resin and the polyol residue of the second polyurethane resin have different average molar ratios of 1,4-butanediol and ethylene glycol.

2. The polyurethane resin composition according to claim 1, wherein an average value of the molar ratio of 1,4-butanediol:ethylene glycol in the first polyurethane resin and the molar ratio of 1,4-butanediol:ethylene glycol in the second polyurethane resin is 7:3 to 3:7.

3. The polyurethane resin composition according to claim 1, wherein each soft segment of the first polyurethane resin and the second polyurethane resin includes a polyester polyol residue having a weight-average molecular weight of 1000 to 4000.

4. The polyurethane resin composition according to claim 3, wherein the polyester polyols included in the first polyurethane resin and the second polyurethane resin have different weight-average molecular weights.

5. The polyurethane resin composition according to claim 1, wherein the polycarboxylic acid includes dicarboxylic acid having 4 to 8 carbon atoms.

6. The polyurethane resin composition according to claim 1, wherein the polyisocyanate compound includes one or more selected from the group consisting of diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, dimeryl diisocyanate (DDI), 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), and naphthylene-1,5-isocyanate (NDI).

7. The polyurethane resin composition according to claim 1, wherein the chain extender includes ethylene glycol and 1,4-butanediol.

8. The polyurethane resin composition according to claim 1, wherein each of the first polyurethane resin and the second polyurethane resin has a weight-average molecular weight of 50,000 to 500,000.

9. The polyurethane resin composition according to claim 1, wherein the surfactant includes an anionic surfactant or a nonionic surfactant.

10. The polyurethane resin composition according to claim 1, further comprising one or more additives selected from the group consisting of a filler, a water repellent, a pore size controller, and a pigment.

11. The polyurethane resin composition according to claim 1, wherein the composition is used for manufacturing a mounting pad of a polishing apparatus.

12. A polyurethane mounting pad, comprising a wet coagulated material of the polyurethane resin composition of claim 1.

13. The polyurethane mounting pad according to claim 12, wherein the pad has compressibility of 35% or higher and compression recovery rate of 92% or higher.

14. The polyurethane mounting pad according to claim 12, wherein the pad has a density ranging from 0.10 to 0.30 g/cm$^3$.

15. The polyurethane resin composition according to claim 1, wherein the molar ratio of 1,4-butanediol to ethylene glycol in the first polyurethane resin is 8:2, 7:3, 6:4, 4:6, 3:7, or 2:8.

* * * * *